US 11,237,824 B2

(12) United States Patent
Masis et al.

(10) Patent No.: US 11,237,824 B2
(45) Date of Patent: Feb. 1, 2022

(54) TRACKING RELATED CHANGES WITH CODE ANNOTATIONS

(71) Applicant: Red Hat, Inc., Raleigh, NC (US)

(72) Inventors: Alexander Braverman Masis, Raanana (IL); Jonathan Daniel Holloway, Rockwall, TX (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/784,538

(22) Filed: Feb. 7, 2020

(65) Prior Publication Data
US 2021/0247976 A1 Aug. 12, 2021

(51) Int. Cl.
*G06F 8/71* (2018.01)
*G06F 8/73* (2018.01)

(52) U.S. Cl.
CPC . *G06F 8/71* (2013.01); *G06F 8/73* (2013.01)

(58) Field of Classification Search
USPC .......................................................... 717/122
See application file for complete search history.

(56) References Cited

U.S. PATENT DOCUMENTS

| | | | | |
|---|---|---|---|---|
| 7,562,342 B2 * | 7/2009 | Berg | ..................... | G06F 40/169 717/108 |
| 7,624,114 B2 * | 11/2009 | Paulus | .................. | G06F 16/972 |
| 8,495,567 B2 | 7/2013 | Bak et al. | | |
| 9,208,064 B2 | 12/2015 | Fryč et al. | | |
| 9,274,756 B1 | 3/2016 | Clausen et al. | | |
| 9,600,273 B2 | 3/2017 | Neubeck et al. | | |
| 2005/0262192 A1 * | 11/2005 | Mamou | .................. | G06Q 10/10 709/203 |
| 2009/0133006 A1 * | 5/2009 | Cheung | ..................... | G06F 8/71 717/144 |
| 2009/0249291 A1 * | 10/2009 | Bak | .......................... | G06F 8/71 717/110 |
| 2014/0173561 A1 * | 6/2014 | Toub | ........................ | G06F 8/73 717/123 |

(Continued)

FOREIGN PATENT DOCUMENTS

CN 106681708 A 5/2017

OTHER PUBLICATIONS

IntelliJ IDEA-Review Changes # ; Published 2000-2019 https://www.jetbrains.com/help/idea/viewing-changes-information.html.

*Primary Examiner* — John Q Chavis
(74) *Attorney, Agent, or Firm* — Haynes and Boone, LLP (57) ABSTRACT

Methods, systems, and computer program products are included for automatically tracking source code changes for a user-customized feature of a software project. Metadata identifying the annotated source code for the user-customized feature is stored in an annotation database. The metadata include a location of the annotated source code within the one or more files of a code repository for the software project and a description of the changes that were made to the annotated source code. The metadata is used to determine whether any subsequent changes made by a second user to the one or more files affect the source code annotated by the first user for the user-customized feature of the software project. One or more automated tasks are performed for the user-customized feature when the subsequent changes are determined to affect the annotated source code.

20 Claims, 5 Drawing Sheets (56) References Cited

U.S. PATENT DOCUMENTS

2016/0170746 A1* 6/2016 Neubeck ............... G06F 8/73
  717/122
2018/0081655 A1* 3/2018 Kudriavtsev ........... G06F 8/51
2019/0266068 A1   8/2019 Raviv et al.

* cited by examiner

TRACKING RELATED CHANGES WITH CODE ANNOTATIONS

FIELD OF DISCLOSURE

The present disclosure relates generally to version control tools for tracking changes to source code during software development, and particularly, to automated version control tools for tracking user-specific changes to source code during software development.

BACKGROUND

A version control system is commonly used to track changes made to one or more files of source code over the course of a software development project. Such a system creates a record of the changes made to the source code file(s) by different users over time. The record may later be used to recall specific versions of the file(s). This allows users to compare changes made by individual users over time and revert selected files or the entire project back to a previous state if necessary to recover from any issues that may have been introduced by a recent change.

BRIEF DESCRIPTION OF THE DRAWINGS

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

A version control system allows differences from one version or state of a source code file to the next to be tracked over the course of a software development project. However, changes that pertain to a specific feature of the software under development or added to the source code for a specific purpose may be difficult to track. For example, it is common in software development to add a workaround in the code to implement a certain feature or provide a temporary solution to a known problem (or bug) prior to an official release of the software. Such a workaround may involve various changes to different segments of source code that are made by multiple users and that span multiple lines of source code, multiple source code files, or even multiple file repositories.

However, the changes to the source code associated with a workaround are often untracked or loosely documented. Conventional tracking solutions is largely a manual process that requires a user to either add an inline comment next to each line of code that is changed or document the change in external file maintained locally on the user's computing device. Furthermore, such conventional solutions provide no way for individual users to track workarounds specific to their use of the code in a manner independent of a software developer, e.g., under the terms of a license granted by the developer, such as the GNU General Public License for open source software.

Embodiments of the present disclosure relate to automated tracking of source code changes with annotations for user-customized features of a software project. A user-customized feature of the software project may be, for example, a workaround introduced by a user (e.g., a software programmer who may be a member of a project team) as a temporary solution to a known issue (or "bug") in one or more segments of source code associated with the software project. The software project may be a software program whose development can be managed using a project management system and whose source code revisions can be tracked using a version control system (also referred to as a source code revision control system). The source code in question may be located within one or more files of a code repository for the software project. The code repository may be a local repository stored within a local data store of the user's computing device. The local repository may include a working copy or snapshot of the source code for the software project at a given point in time along with any changes that the user makes from that point. For example, the local repository on the user's device may store a working directory of source code files that have been checked out or downloaded from a central code repository stored at a remote server. The central repository may be accessible to computing devices of multiple users (or team members) associated with the software project via a communication network.

As will be described in further detail below, the disclosed embodiments may be used to provide an automated annotation tracker that enables the user in this example to annotate changes to the source code for a customized feature of the software project, e.g., a workaround introduced by the user, as described above, and track or monitor any subsequent source code changes made by other users that affect the user's customized feature. For example, the user-customized feature may correspond to annotated source code changes that span several lines of source code within one or multiple files and repositories associated with the software project. In one or more embodiments, an annotation tracker may be configured to automatically track changes to the files in which the annotated code resides and perform one or more user-specified actions upon determining that a subsequent change affects the annotated code related to the user-customized feature. The user-specified action(s) may include, for example, sending a notification alerting the user of the subsequent change.

Figure 1:
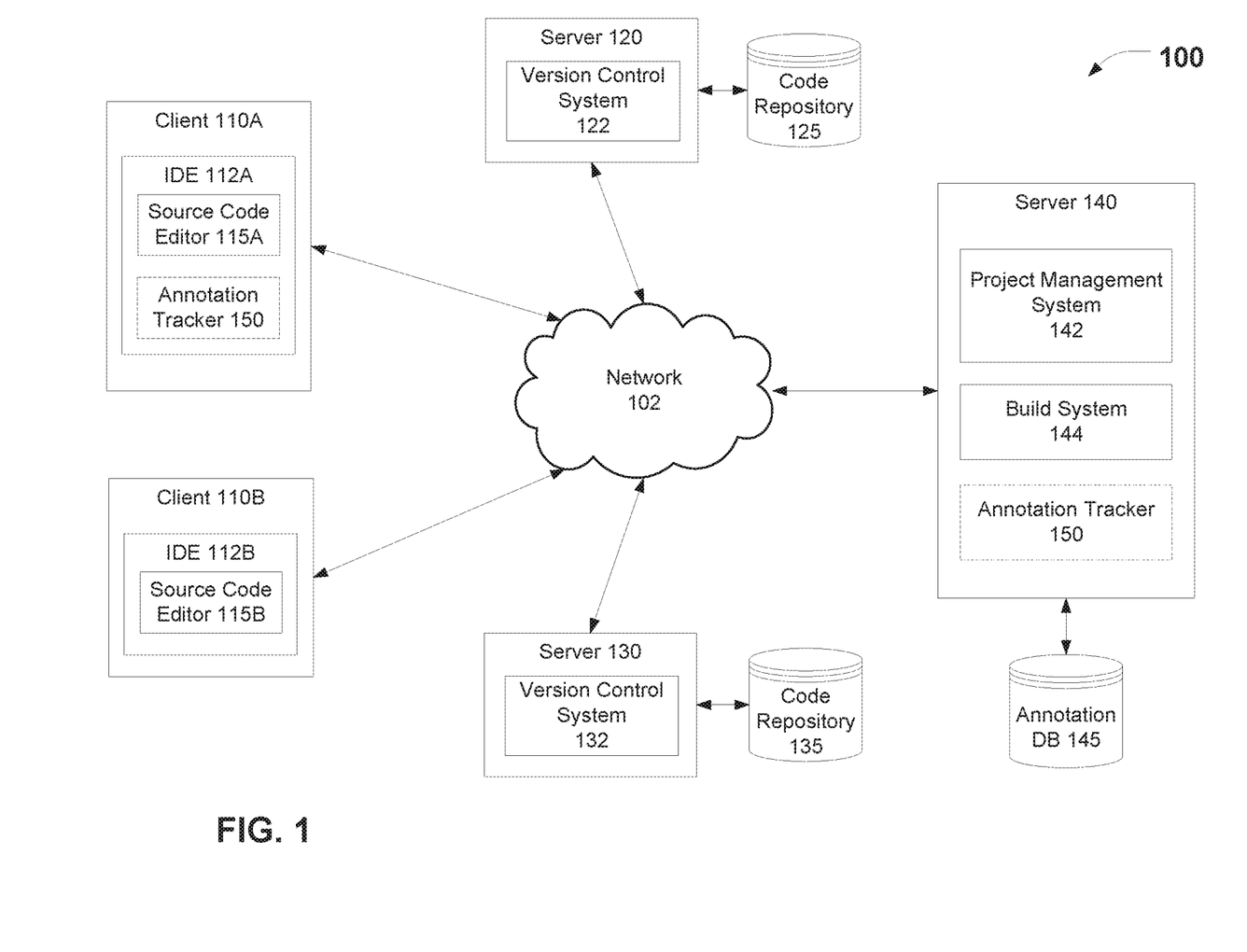
FIG. 1 is a block diagram illustrating an example of a system for automated tracking of annotated source code changes for user-customized features of a software project.

FIG. 1 is a block diagram illustrating an example of a system 100 for automated tracking of annotated source code changes for user-customized features of a software project. As shown in FIG. 1, system 100 includes clients 110A and 110B (collectively, "clients 110A-B"), a server 120, a server 130, and a server 140. While only clients 110A and 110B are shown, it should be appreciated that system 100 may include any number of clients. Likewise, while only servers 120, 130, and 140 are shown, system 100 may include any number of servers.

Each of clients 110A-B communicates with one or more of servers 120, 130, and 140 via a network 102. Network 102 can be any network or combination of networks that can carry data communication. Such a communication network may include, but is not limited to, a local area network, medium area network, and/or wide area network such as the Internet. Each of clients 110A-B can be implemented using any type of computing device having at least one processor and a processor-readable storage medium for storing data and instructions executable by the processor. Examples of such a computing device include, but are not limited to, a mobile phone, a personal digital assistant (PDA), a tablet computer, a laptop computer, a desktop computer, a workstation, a cluster of computers, a set-top box, or similar type of computing device.

In one or more embodiments, clients 110A-B may communicate over network 102 with version control systems 122 and 132 hosted by servers 120 and 130, respectively. Each of servers 120 and 130 may be any type of computing device including, for example and without limitation, a server, a gateway, a desktop computer, a workstation, a laptop computer, a tablet or other type of mobile computing device. Version control systems 122 and 132 may be used to record changes to one or more files of source code for the software project over time. The changes may be made by, for example, different members of a software development group or project team associated with the software project. It is assumed for purposes of this example that the members of the software project team include the users of clients 110A-B. Version control systems 122 and 132 may be implemented using any of various well-known version control systems, including any proprietary or open-source version control system. Examples of such version control systems include, but are not limited to, Concurrent Versions System (CVS), Subversion (SVN), Git, and Mercurial. Although not shown in FIG. 1, it should be appreciated that version control systems 122 and 132 may be implemented as a single, centralized version control system hosted by server 140. Likewise, the source code for the software project may be stored and maintained in a central code repository coupled to server 140. Such a central code repository may serve as the place from which source code can be distributed over network 102.

In one or more embodiments, each of version control systems 122 and 132 may be implemented as an application or service hosted by servers 120 and 130, respectively, and accessible via network 102 to a software development application executable at clients 110A-B. Each of version control systems 122 and 132 may use a different version control framework that is unique to the code repository (e.g., code repository 125 or 135) that it manages. The software development application may be, for example, an integrated development environment (IDE) that combines different software development tools and their associated functions into a single application program with a common graphical user interface (GUI). Examples of such tools include, but are not limited to, source code editors, compilers, linkers, and debuggers. Accordingly, clients 110A-B in FIG. 1 may execute IDEs 112A and 112B ("IDEs 112A-B") that include source code editors 115A and 115B ("source code editors 115A-B"), respectively, in addition to other software development tools (not shown).

In one or more embodiments, source code editors 115A-B of IDEs 112A-B may enable the respective users of clients 110A-B to access different features of version control systems 122 and 132. As will be described in further detail below, such features may enable each user to collaborate with other members of the software project team over network 102. For example, version control systems 122 and 132 may enable each user to check out a current or historical snapshot of the software project as of a given date or revision number, view a comparison between different versions of files, view a complete history of changes, and check in or "commit" source code changes made by the user.

In one or more embodiments, the source code for the software project may be distributed across multiple code repositories for the software project. In some implementations, each code repository may be associated with a different version control system. For example, version control systems 122 and 132 may be associated with different code repositories 125 and 135, respectively, as shown in FIG. 1. Code repositories 125 and 135 may be any type of local or remote data store for storing files of source code (or "source files") associated with the software project. While only code repositories 125 and 135 are shown in FIG. 1, it should be appreciated that system 100 may include additional code repositories, each of which may be associated with a different version control system for the software project. It should also be appreciated that each code repository may employ various compression techniques, such as delta compression, to efficiently store the source code files.

In one or more embodiments, the users of clients 110A-B may use source code editors 115A-B to make changes to local copies of the source code checked out or downloaded from the respective central repositories 125 and 135 via network 102. Source code editors 115A-B may provide each user to push or commit the source code changes back to the appropriate version control system for storage in the associated code repository. When a user is ready to implement a source code revision, the user may use the GUI of the source code editor to input a command for submitting the new revision into the version control system. The version control system would then perform a commit operation upon receiving the user's command over network 102.

In one or more embodiments, as members of the software project team, e.g., the users of clients 110A-B, make changes to a source code file for release, each user may submit an update or commit command to trigger version control system 122 or 132 to archive that version in code repository 125 or 135. As used herein, the term "commit" may refer to a process by which users of clients 110A-B or other software project team members trigger version control system 122 or 132 to record the changes made to one or more files of source code associated with the software project.

Each time a user makes (or "commits") a change to source code file(s) stored in code repository 125 or 135, version control system 122 or 132 logs data pertaining to the change into a commit log. Such data may include information describing the source code change (e.g., the type and location of the file(s) and repository in which the changed source code is stored) as well as information identifying the user that committed the change. Each entry in the commit log may be assigned a unique identifier that identifies the specific commit. The may include, for example, the specific changes made to one or more lines of source code in at least one source file associated with the software project. In addition to the commit identifier, the commit log may include a time stamp, a project identifier that specifies the project to which the commit log corresponds, user identifiers, and any other relevant information related to the project. The commit log may be stored as part of the respective code repositories 125 and 135 or in separate data stores coupled to version control systems 122 and 132. Version control systems 122 and 132 may store or update a separate commit log each time a user executes a commit.

In one or more embodiments, annotation tracker 150 may be used to automatically track annotated source code changes for a user-customized feature of the software project. For example, the source code changes may be annotated by a user of client 110A via source code editor 115A. Source code editor 115A may also provide the user with an option to enable the automated annotation tracking feature, e.g., via a menu or other UI control element provided within the GUI of IDE 112A. The user-customized feature may correspond to annotated source code changes that span several lines of source code within one or multiple files and repositories associated with the software project. As will be described in further detail below, annotation tracker 150 may be configured to automatically track changes to the files in which the annotated code resides and perform one or more user-specified actions upon determining that a subsequent change affects the annotated code related to the user-customized feature.

As shown in FIG. 1, annotation tracker 150 may be implemented as a component of IDE 112A at client 110A. While not shown in FIG. 1, it should be appreciated that annotation tracker 150 may also be implemented as a component of IDE 112B at client 110B. Alternatively, annotation tracker 150 may be implemented as a remote application or service hosted by server 140 and accessible to clients 110A-B over network 102. For example, annotation tracker 150 may be implemented on server 140 alongside a project management system 142 and a build system 144 for the software project. As will be described in further detail below, annotation tracker 150 may store metadata for annotations related to user-customized features of the software project in an annotation database 145. Annotation database 145 may be a local or remote data store coupled to server 140 or client 110A. For example, annotation database 145 for a client-side implementation of annotation tracker 150 (e.g., at client 110A in FIG. 1) may be implemented as a file stored in a local data store or memory of the client device.

Project management system 142 in this example may be configured with the location (e.g., path name) of the source code to be managed and the type of version control system that is being used (e.g., CVS, SVN, GIT, and Mercurial). The users of clients 110A-B can access the project management system 142 via IDE 115A-B or other application (e.g., a web browser) executable at each user's device. The project management system 142 can create and maintain project management data for various projects in a project management data store that is coupled to the project management system 142. The project management data can include current task status data for each task in a project. Build system 144 may include a suite of tools to assist in configuring and making various source code packages or distributions. For example, build system 144 may be implemented using the well-known GNU build system software that is running on a general-purpose server. Build system 144 may comprise various well-known utilities to assist in configuring and building packages or distributions of software. For example, build system 144 may be implemented as a typical GNU build system, which comprises common utility programs, such as make, gettext, pkg-config, and the GNU Compiler Collection (GCC).

Figure 2:
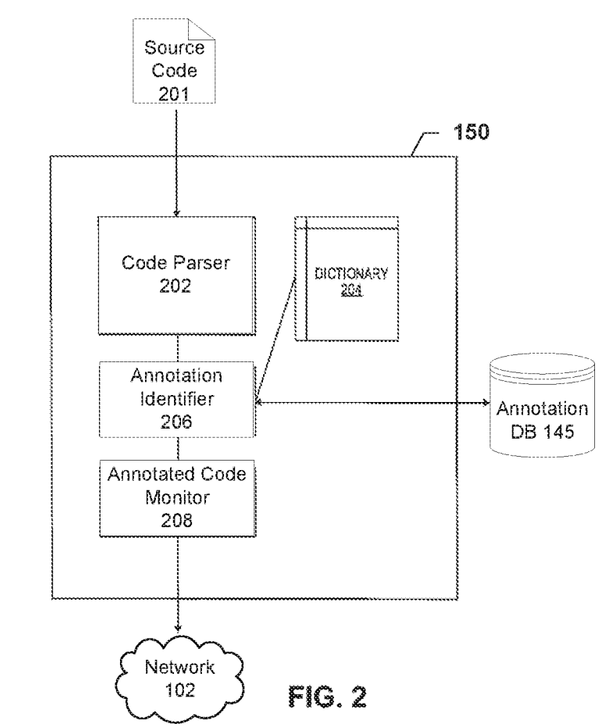
FIG. 2 is a block diagram illustrating an example of an annotation tracker for implementing the automated annotation tracking functionality in the system of FIG. 1.

FIG. 2 is a block diagram illustrating an example of an annotation tracker 150 for implementing the automated annotation tracking functionality in system 100 of FIG. 1, as described above. As shown in FIG. 2, annotation tracker 150 includes a code parser 202, a dictionary 204, an annotation identifier 206, and an annotated code monitor 208. However, it should be appreciated that embodiments are not intended to be limited thereto and that annotation tracker 150 may include additional components as desired for a particular implementation.

Code parser 202 may receive an indication of a change made by a first user, e.g., a user of client 110A of FIG. 1, as described above, to source code 201 within one or more files of a code repository, e.g., code repository 125 of FIG. 1, for a software project. For example, code parser 202 may receive one or more source code files 201 including a change made by a user, e.g., a user of client 110A of FIG. 1, as described above, for submission to a code repository, e.g., code repository 125 of FIG. 1, of a software project. The code repository may be one of a plurality of code repositories for the software project. In some implementations, each code repository may be associated with a different version control system, e.g., one of version control systems 122 and 132 of FIG. 1, as described above. Code parser 202 may parse source code file(s) 201 for annotations indicating that the change may be related to a user-customized feature of the software project, e.g., a workaround introduced by the user.

In one or more embodiments, code parser 202 may use annotation identifier 206 to determine whether the parsed source code file(s) 201 includes at least one annotation related to a user-customized feature of the software project, e.g., a workaround introduced by the user. In one or more embodiments, code parser 202 may be configured to parse the source code in code repository 125 or 135 and convert it to a data structure that can be analyzed by annotation identifier 206. The annotation may be, for example and without limitation, a keyword specified by the user for the user-customized feature. The keyword may be stored in dictionary 204 along with other keywords for the user-customized feature. Accordingly, annotation identifier 206 may use dictionary 204 to determine whether source code file(s) 201 is annotated with a keyword for the user-customized feature. In some implementations, dictionary 204 may include a list of different keywords for each of a plurality of user-customized features for the software project.

When source code file(s) 201 is determined to be annotated for the user-customized feature of the software project, annotation identifier 206 may store metadata identifying the annotated portion of source code file(s) 201 for the user-customized feature in an annotation database 145. The metadata may include, for example and without limitation, a location of the annotated source code change within the one or more files of the code repository and a description of the changes that were made to the annotated source code. Once the metadata for the annotated source code related to the user-customized feature is stored, source code file(s) 201 with the user's changes may be checked-in or submitted to a version control system, e.g., version control system 122 of FIG. 1, as described above, which merges the changes into the code repository and updates a corresponding commit log.

In one or more embodiments, the metadata may be updated with information obtained from a commit log maintained by the version control system. In one or more embodiments, the metadata may be linked to a commit identifier that corresponds to an entry in the commit log. In some implementations, the metadata may also include information related to the version control system itself. Examples of such information may include, but are not limited to, the location of the version control system, type of version control system that is being used for a particular project, location identifiers of one or more related version control systems, collection parameters specifying time periods for when to collect the commit logs from each version control system, collection parameters specifying the types of keywords to search for in a commit log, output parameters for generating reports and sending notifications, etc. Examples of a location identifier of a version control system may include, but are not limited to, a directory location of the version control system, a URL on the Internet of the source code revision control system, etc. The information may be user-defined, for example, by a project manager or project team member via a user interface of an application (e.g., IDE 112A of FIG. 1) executable at the user's device.

In one or more embodiments, annotated code monitor 208 may collect commit logs from each version control system associated with the software project to determine whether any subsequent changes to source code files 201 have been made by any other user, e.g., the user of client 110B of FIG. 1, as described above. Annotated code monitor 208 may collect the commit logs on a periodic basis, e.g., according to a predetermined time period (e.g., once a minute, once an hour, once at 5:00 o'clock in the afternoon, etc.). Annotated code monitor 208 may examine a commit log to determine whether it is the newest commit log reflecting the most recent changes to the source code and update the metadata stored in annotation database 145 as necessary.

Annotated code monitor 208 may parse new commit logs (e.g., commit logs that have a time stamp that follows the time stamp the metadata was added to annotation database 145) and search for annotations, e.g., keywords stored in dictionary 204. A keyword in this context may be a characteristic of the user-customized feature of the software project, e.g., a workaround related to a project task and/or a combination of task characteristics. The keywords can be user-defined. Examples of keywords can include, and are not limited to, task identifiers, tasks statuses (task states), etc. Accordingly, annotated code monitor 208 may be configured via dictionary 204 to search for a word, a task identifier, or a combination of both.

In addition to changes to the same source code files 201, annotated code monitor 208 may monitor changes to other source code files in the code repositories associated with the software project to determine whether any of these changes affect the annotated source code for the user-customized feature of the software project. Such changes may include changes made by other users to source code files in other code repositories changes that are annotated with one of the designated keywords listed in dictionary 204 for the user-customized feature.

Upon determining that a subsequent change affects the annotated code for the user-customized feature, annotated code monitor 208 may identify one or more automated tasks to be performed for the user-customized feature based on the associated metadata stored in annotation database 145. The one or more tasks may include, for example and without limitation, displaying a notification of the changes to the one or more files at the first user's computing device (e.g., client 110A) and executing an automation script including instructions for the one or more automated tasks. It should be appreciated that such a script may be written in any of various well-known scripting languages, as desired for a particular implementation. Examples of notifications may include, but are not limited to, messages (e.g., email messages, text messages, instant messages, social network messages, etc.) transmitted over a communication network (e.g., network 102 of FIG. 1, as described above), and visual or audio indicators on a client device (e.g., clients 110A-B in FIG. 1). For example, a visual indicator may be provided by highlighting appropriate sections of code displayed in a source code editor, e.g., source code editor 115A-B of FIG. 1, executable at the client device.

Figure 3:
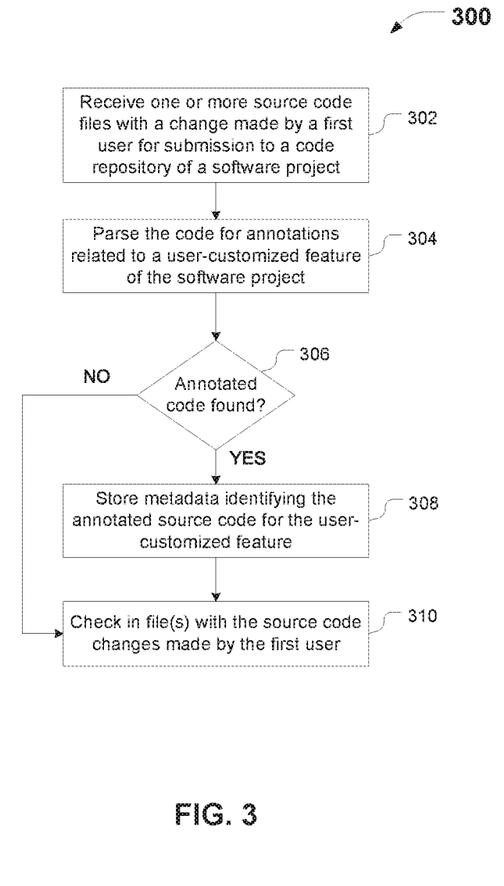
FIG. 3 is a flowchart of a process for storing metadata related to annotated source code changes for a user-customized feature of a software project, according to one or more embodiments of the present disclosure.

FIG. 3 is a flowchart of a process 300 for storing metadata related to annotated source code changes for a user-customized feature of a software project, according to one or more embodiments of the present disclosure. It is assumed for purposes of this example that the source code is for a software project with multiple users/project team members and that the source code resides in one or more files of a code repository associated with the project and managed by at least on version control system, e.g., version control systems 122 and 132 of FIG. 1, as described above. Also, for purposes of explanation and discussion, process 300 will be described using system 100 of FIG. 1 and annotation tracker 150 of FIGS. 1 and 2, as described above. However, process 300 is not intended to be limited thereto.

As shown in FIG. 3, process 300 begins in step 302, which includes receiving one or more source code files with a change made by a first user for submission to the code repository of the software project, e.g., code repository 125 of FIG. 1, as described above.

Process 300 then proceeds to step 304, which includes parsing the source code in the one or more files for annotations related to a user-customized feature of the software project. This may include determining whether the change made by the first user is annotated (e.g., with a keyword, as described above) for the user-customized feature.

If it is determined in step 306 that the source code includes such an annotation, process 300 proceeds to step 308, which includes storing metadata identifying the annotated source code for the user-customized feature. As described above, the metadata may be stored in an annotation database, e.g., annotation database 145 of FIGS. 1 and 2.

Otherwise, process 300 proceeds directly to step 310, which includes checking in the file(s) with the source code changes made by the first user to the code repository.

Figure 4:
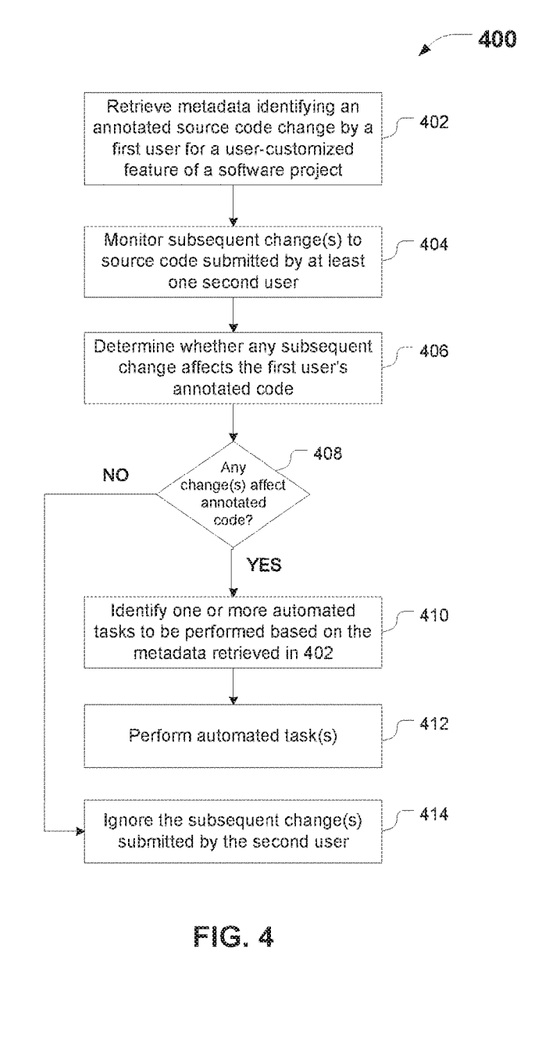
FIG. 4 is a flowchart of a process for automated tracking of source code changes that affect a user-customized feature of a software project, according to one or more embodiments of the present disclosure.

FIG. 4 is a flowchart of a process 400 for automated tracking of source code changes that affect a user-customized feature of a software project, according to one or more embodiments of the present disclosure. Like process 300 of FIG. 3 above, process 400 will be described using system 100 of FIG. 1 and annotation tracker 150 of FIGS. 1 and 2, as described above, but process 400 is not intended to be limited thereto. For example, the steps of processes 300 and 400 may be performed by the various components of annotation tracker 150, as described above.

Process 400 begins in step 402, which includes retrieving, e.g., from an annotation database, metadata identifying an annotated source code change made by a first user for a user-customized feature of a software project.

In step 404, the metadata is used to monitor subsequent change(s) to source code submitted by at least one second user.

Process 400 then proceeds to step 406, which includes determining whether any subsequent change monitored in step 404 affects the first user's annotated code.

If any change made by a second user is determined to affect the annotated code in step 408, process 400 proceeds to step 410, which includes identifying one or more automated tasks to be performed for the user-customized feature, followed by step 412, in which the automated task(s) are performed. Otherwise, process 400 proceeds to step 414 and the subsequent change submitted by the second user is ignored. The automated task(s) may be identified in step 410 based on the metadata retrieved in step 402.

Figure 5:
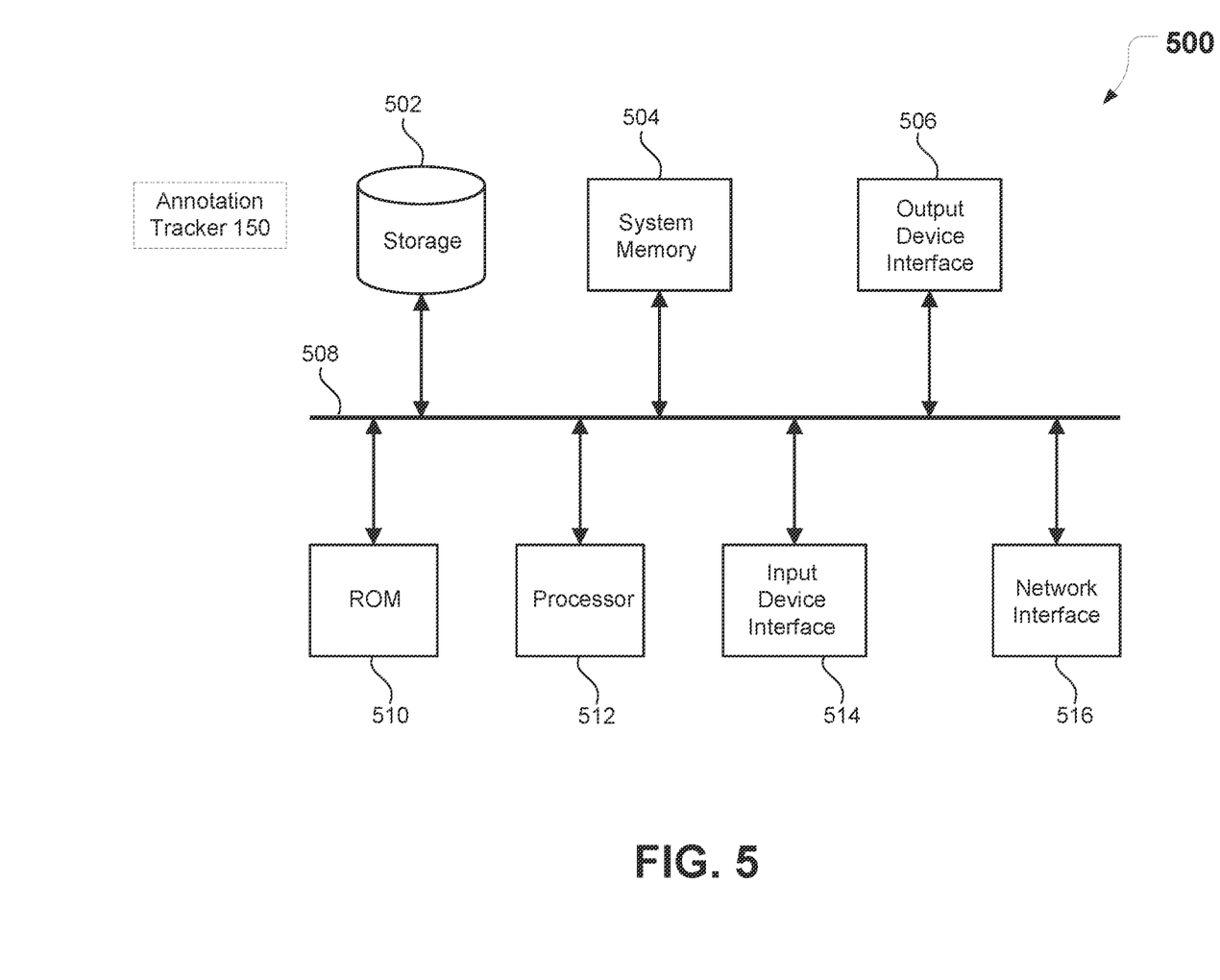
FIG. 5 is a block diagram illustrating an example of a computer system in which embodiments of the present disclosure may be implemented.

FIG. 5 is a block diagram illustrating an example of a computer system 500 in which embodiments of the present disclosure may be implemented. For example, annotation tracker 150 of FIGS. 1 and 2, as described above, and processes 300 and 400 of FIGS. 3 and 4, respectively, as described above, may be implemented using system 500. System 500 can be a computer, phone, PDA, or any other type of electronic device. Such an electronic device includes various types of computer readable media and interfaces for various other types of computer readable media. As shown in FIG. 5, system 500 includes a permanent storage device 502, a system memory 504, an output device interface 506, a system communications bus 508, a read-only memory (ROM) 510, processing unit(s) 512, an input device interface 514, and a network interface 516.

Bus 508 collectively represents all system, peripheral, and chipset buses that communicatively connect the numerous internal devices of system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of system 500. Permanent storage device 502, on the other hand, is a read-and-write memory device. This device is a non-volatile memory unit that stores instructions and data even when system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for computer aided pipe string design based on existing string designs in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the system 500. Input devices used with input device interface 514 include, for example, alphanumeric, QWERTY, or T5 keyboards, microphones, and pointing devices (also called "cursor control devices"). Output device interfaces 506 enables, for example, the display of images generated by the system 500. Output devices used with output device interface 506 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 5, bus 508 also couples system 500 to a public or private network (not shown) or combination of networks through a network interface 516. Such a network may include, for example, a local area network ("LAN"), such as an Intranet, or a wide area network ("WAN"), such as the Internet. Any or all components of system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 300 and 400 of FIGS. 3 and 4, respectively, as described above, may be implemented using system 500 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
   receiving, by a first computing device, an indication of changes made by a first user to source code within one or more files of a code repository for a software project;
   responsive to the received indication, determining whether the source code that was changed is annotated for a user-customized feature of the software project;
   when the source code is determined to be annotated for the user-customized feature of the software project, storing metadata identifying the annotated source code for the user-customized feature in an annotation database, the metadata including a location of the annotated source code within the one or more files of the code repository and a description of the changes that were made to the annotated source code;
   responsive to receiving an indication of subsequent changes made by a second user to the one or more files of the code repository for the software project, determining whether the subsequent changes to the one or more files affect the annotated source code for the user-customized feature of the software project, based on the metadata stored in the annotation database;
   when the subsequent changes to the one or more files are determined to affect the annotated source code, performing one or more automated tasks associated with the user-customized feature of the software project.

2. The method of claim 1, wherein the source code is annotated with a unique identifier for the user-customized feature of the software project.

3. The method of claim 1, wherein the one or more automated tasks include displaying a notification of the subsequent changes to the one or more files at the first computing device.

4. The method of claim 1, wherein performing the one or more automated tasks comprises executing an automation script including instructions for the one or more automated tasks.

5. The method of claim 1, wherein the code repository is a first of a plurality of code repositories for the software project, and the method further comprises:
   receiving, by the first computing device from a second computing device, an indication of changes made by the second user to source code within a second code repository of the software project;

upon determining that the source code in the second code repository is also annotated for the user-customized feature of the software project, updating the metadata stored in the annotation database for the user-customized feature, based on the changes to the annotated source code in the second code repository;

monitoring changes to files stored in the plurality of code repositories associated with the software project to determine whether the monitored changes affect the annotated source code within the respective first and second code repositories for the user-customized feature of the software project; and upon determining that the monitored changes for at least one of the additional code repositories affect the annotated source code, providing notifications of the monitored changes affecting the annotated source code to the first and second computing devices.

6. The method of claim 1, wherein the first code repository is associated with a first version control system, and the second code repository is associated with a second version control system.

7. The method of claim 6, wherein the first version control system uses a first version control framework that is unique to the first code repository and the second version control system uses a second version control framework that is unique to the second code repository.

8. The method of claim 6, wherein the metadata is updated to include a description of the changes made to the annotated source code in each of the first and second code repositories based on a unique commit identifier received from the respective first and second version control systems.

9. The method of claim 8, wherein the unique commit identifier identifies the changes made to one or more lines of source code in at least one source file associated with the software project.

10. A system comprising:
a processor; and
a memory coupled to the processor having instructions stored therein, which, when executed by the processor, cause the processor to perform a plurality of operations, including operations to:
receive an indication of changes made by a first user to source code within one or more files of a code repository for a software project;
determine whether the source code that was changed is annotated for a user-customized feature of the software project;
when the source code is determined to be annotated for the user-customized feature of the software project, store metadata identifying the annotated source code for the user-customized feature in an annotation database, the metadata including a location of the annotated source code within the one or more files of the code repository and a description of the changes that were made to the annotated source code;
receive an indication of subsequent changes made by a second user to the one or more files of the code repository for the software project;
determine whether the subsequent changes to the one or more files affect the annotated source code for the user-customized feature of the software project, based on the metadata stored in the annotation database; and
when the subsequent changes to the one or more files are determined to affect the annotated source code, perform one or more automated tasks associated with the user-customized feature of the software project.

11. The system of claim 10, wherein the source code is annotated with a unique identifier for the user-customized feature of the software project.

12. The system of claim 10, wherein the one or more automated tasks include displaying a notification of the subsequent changes to the one or more files at the first computing device.

13. The system of claim 10, wherein the one or more automated tasks are performed by executing an automation script including instructions for the one or more automated tasks.

14. The system of claim 10, wherein the code repository is a first of a plurality of code repositories for the software project, and the operations performed by the processor further include operations to:
receive, from the second user's computing device, an indication of changes to source code within a second code repository of the software project;
determine that the source code in the second code repository is also annotated for the user-customized feature of the software project;
update the metadata stored in the annotation database for the user-customized feature, based on the changes to the annotated source code in the second code repository;
monitor changes to files stored in the plurality of code repositories associated with the software project to determine whether the monitored changes affect the annotated source code within the respective first and second code repositories for the user-customized feature of the software project;
determine that the monitored changes for at least one of the additional code repositories affect the annotated source code; and
provide notifications of the monitored changes affecting the annotated source code to the first and second computing devices.

15. The system of claim 10, wherein the first code repository is associated with a first version control system having a first version control framework, and the second code repository is associated with a second version control system.

16. The system of claim 15, wherein the first version control system uses a first version control framework that is unique to the first code repository and the second version control system uses a second version control framework that is unique to the second code repository.

17. The system of claim 15, wherein the metadata is updated to include a description of the changes made to the annotated source code in each of the first and second code repositories based on a unique commit identifier received from the respective first and second version control systems.

18. The system of claim 17, wherein the unique commit identifier identifies the changes made to one or more lines of source code in at least one source file associated with the software project.

19. A non-transitory computer-readable storage medium having instructions stored therein, which when executed by a computer cause the computer to perform a plurality of operations, including operations to:
receive an indication of changes made by a first user to source code within one or more files of a code repository for a software project;
determine whether the source code that was changed is annotated for a user-customized feature of the software project;

when the source code is determined to be annotated for the user-customized feature of the software project, store metadata identifying the annotated source code for the user-customized feature in an annotation database, the metadata including a location of the annotated source code within the one or more files of the code repository and a description of the changes that were made to the annotated source code;

receive an indication of subsequent changes made by a second user to the one or more files of the code repository for the software project;

determine whether the subsequent changes to the one or more files affect the annotated source code for the user-customized feature of the software project, based on the metadata stored in the annotation database; and when the subsequent changes to the one or more files are determined to affect the annotated source code, perform one or more automated tasks associated with the user-customized feature of the software project.

20. The non-transitory computer-readable storage medium of claim 19, wherein the one or more automated tasks include providing a notification of the subsequent changes to a computing device of the first user.

* * * * *